(12) United States Patent
Hoof

(10) Patent No.: US 7,203,193 B2
(45) Date of Patent: Apr. 10, 2007

(54) IN-BAND MESSAGE SYNCHRONIZATION FOR DISTRIBUTED SHARED MEMORY PACKET SWITCH

(75) Inventor: Werner Van Hoof, Kanata (CA)

(73) Assignee: Alcatel Lucent, Paris (FR)

( * ) Notice: Subject to any disclaimer, the term of this patent is extended or adjusted under 35 U.S.C. 154(b) by 1045 days.

(21) Appl. No.: 10/188,255

(22) Filed: Jul. 1, 2002

(65) Prior Publication Data

US 2003/0016688 A1 Jan. 23, 2003

Related U.S. Application Data

(60) Provisional application No. 60/306,197, filed on Jul. 17, 2001.

(51) Int. Cl.
*H04L 12/28* (2006.01)

(52) U.S. Cl. .................................. 370/389; 370/395.7

(58) Field of Classification Search ..................... None
See application file for complete search history.

(56) References Cited

U.S. PATENT DOCUMENTS

| | | | |
|---|---|---|---|
| 5,291,482 A | 3/1994 | McHarg et al. | |
| 5,475,679 A | 12/1995 | Munter | |
| 5,535,197 A | 7/1996 | Cotton | |
| 5,548,590 A | 8/1996 | Grant et al. | |
| 5,634,011 A | 5/1997 | Auerbach et al. | |
| 5,677,683 A | 10/1997 | Kawasaki et al. | |
| 5,689,506 A | 11/1997 | Chiussi et al. | |
| 5,748,629 A | 5/1998 | Caldara et al. | |
| 5,813,043 A | 9/1998 | Hes et al. | |
| 5,867,663 A | 2/1999 | McClure et al. | |
| 5,956,342 A | 9/1999 | Manning et al. | |
| 5,974,467 A | 10/1999 | Haddock et al. | |

(Continued)

FOREIGN PATENT DOCUMENTS

EP 0374337 A1 6/1990

OTHER PUBLICATIONS

International Search Report dated Dec. 19, 2002, for corresponding PCT Patent Application No. PCT/US02/21405 filed Jul. 1, 2002.

(Continued)

*Primary Examiner*—Phirin Sam
(74) *Attorney, Agent, or Firm*—Craig A. Hoersten; V. Lawrence Sewell

(57) ABSTRACT

The present invention is directed to synchronizing notification messages transmitted to egress control units to allow an even distribution of the messages. A plurality of packet buffer units (PBUs) may concurrently transmit notification messages to a particular egress control unit in response to packets received from a plurality of ingress control units. Each PBU includes a notification queue associated with the egress control unit for storing notifications generated by the PBU. Notifications in the notification queues are ordered according to the ingress units triggering the notifications. Notifications in each notification queue are retrieved via a time-driven pointer that is initialized to a different start entry position for the notification queues in each PBU. This allows each PBU to transmit, at any given time, notifications to the egress control unit that are associated with a different ingress unit. The receiving egress control unit maintains a plurality of memory units for concurrently storing of a portion of the received notification messages based on their associated ingress input units.

20 Claims, 8 Drawing Sheets

U.S. PATENT DOCUMENTS

| | | |
|---|---|---|
| 6,023,471 A | 2/2000 | Haddock et al. |
| 6,081,906 A | 6/2000 | Nishizawa et al. |
| 6,141,344 A | 10/2000 | DeLong |
| 6,173,425 B1 | 1/2001 | Knaack et al. |
| 6,189,073 B1 | 2/2001 | Pawlowski |
| 6,216,167 B1 | 4/2001 | Momirov |
| 6,807,172 B1 * | 10/2004 | Levenson et al. ........... 370/389 |
| 6,807,594 B1 * | 10/2004 | Sindhu et al. .............. 710/240 |
| 7,007,071 B1 * | 2/2006 | Brown ....................... 709/213 |
| 2003/0002509 A1 * | 1/2003 | Vandenhoudt et al. . 370/395.72 |
| 2003/0016689 A1 * | 1/2003 | Hoof .......................... 370/428 |

OTHER PUBLICATIONS

U.S. Appl. No. 10/147,279, filed May 15, 2002, Vandenhoudt et al.
U.S. Appl. No. 10/180,279, filed Jun. 26, 2002, Van Hoff.

* cited by examiner

IN-BAND MESSAGE SYNCHRONIZATION FOR DISTRIBUTED SHARED MEMORY PACKET SWITCH

CROSS-REFERENCE TO RELATED APPLICATION(S)

This application claims the benefit of U.S. provisional application No. 60/306,197, filed on Jul. 17, 2001, the content of which is incorporated herein by reference.

FIELD OF THE INVENTION

This invention relates generally to packet switching systems, and more particularly, to synchronizing notification messages transmitted to egress schedulers in a distributed shared memory packet switch.

BACKGROUND OF THE INVENTION

A switch fabric in a data communications switch facilitates the transport of data packets received from an ingress port to an egress port for forwarding the packet to a destination. The switch fabric may be implemented as a crossbar switch, cell switch, or shared memory packet switch. One advantage of the shared memory packet switch when compared to other types of switch fabrics is its robustness under high traffic loads. Shared memory packet switches generally provide for lower packet loss and lower latency than other types of switch fabrics.

Shared memory packet switches, however, typically provide a central logic for storing and accessing packets destined for all egress ports. As fabric size increases, this also increases the burden on the central logic. Thus, shared memory packet switches often suffer from a lack of scalability beyond a data rate 100 Gbit/sec.

U.S. Patent Application entitled "DISTRIBUTED SHARED MEMORY PACKET SWITCH," filed on May 15, 2002, and assigned to the assignee of the present application, the content of which is incorporated herein by reference, proposes a solution for overcoming the problem of lack of scalability in shared memory packet switches via a distributed shared memory packet switch. Generally, the solution includes a shared memory packet switch made up of N packet buffer units coupled to M ingress control units and M egress control units. Each of the M ingress control units is coupled to the N packet buffer units by N ingress serial links where each ingress serial link is dedicated to a single packet buffer unit. Similarly, each of the M egress control units is coupled to the N packet buffer units by N egress serial links where each egress serial link is dedicated to a single packet buffer unit.

Each packet buffer unit includes a memory for storing a packet received from any of M ingress control units via their dedicated ingress serial links. Upon receipt of a packet by the packet buffer unit, notifications are sent to any of M egress control units that may be interested in the packet via their dedicated egress serial links. If an egress control unit determines that it has enough room in the appropriate egress queue, it transmits a booking message requesting that the packet be maintained by the packet buffer unit until requested by the egress control unit.

With the above-described solution, a situation may arise that at a particular instance of time, an egress control unit receives multiple notifications transmitted by multiple packet buffer units via their corresponding egress serial links, resulting in a burst-overload of notifications to be processed by the egress control unit. Accordingly, what is desired is a distributed shared memory packet switch that provides a non-bursty load of notifications to the egress control units.

SUMMARY OF THE INVENTION

The present invention is directed to synchronizing notification messages transmitted to the egress units to allow an even distribution of the messages. According to one embodiment, the invention is directed to a packet switching system that includes a plurality of ingress units, a plurality of egress units, and a switch fabric coupled to the plurality of ingress units and egress units. The switch fabric receives packets from the plurality of ingress units and generates notification messages in response. Each notification message that is generated is ordered based on the ingress unit transmitting the associated packet, and is transmitted to one or more egress units according to the order assigned to the message based on the associated ingress unit.

According to another embodiment, the invention is directed to a method for processing packets in a packet switching system including a plurality of ingress units, a plurality of egress units, and a switch fabric coupled to the plurality of ingress units and egress units. The method includes receiving at the switch fabric packets transmitted by the plurality of ingress units, generating at the switch fabric a notification message for each received packet, storing at the switch fabric the generated notification messages in one or more notification queues, the notification messages stored in the one or more notification queues being ordered according to the ingress unit transmitting the associated packet, and transmitting the notification messages to one or more egress units according to the order of the notification messages in the one or more notification queues.

In one embodiment, the switch fabric includes a plurality of buffer units receiving and storing packets transmitted by the plurality of ingress units, each buffer unit including a notification queue for each of the plurality of egress units.

In another embodiment, a set of first pointers for retrieving notifications stored in notification queues of a first buffer unit are initialized to a first start entry and a set of second pointers for retrieving notifications stored in notifications queues of a second buffer unit are initialized to a second start entry.

In a further embodiment, the pointers advance to a next entry of its respective notification queue in a synchronized manner.

In yet another embodiment, each of the plurality of egress units includes a first memory and a second memory for storing notification messages transmitted by the switch fabric. The first memory stores notification messages generated based on packets transmitted by the first set of ingress units and the second memory stores notification messages generated based on packets transmitted by the second set of ingress units. According to one embodiment, the first memory and second memory are accessed concurrently for storing a notification message associated with its ingress unit.

It should be appreciated, therefore, that the present invention allows notification messages transmitted by different packet buffer units to a particular egress unit to be ordered according to the ingress units. The receiving egress unit may then maintain a plurality of memory units for concurrently storing a portion of the received notification messages based on their associated ingress input units.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

Figure 1:
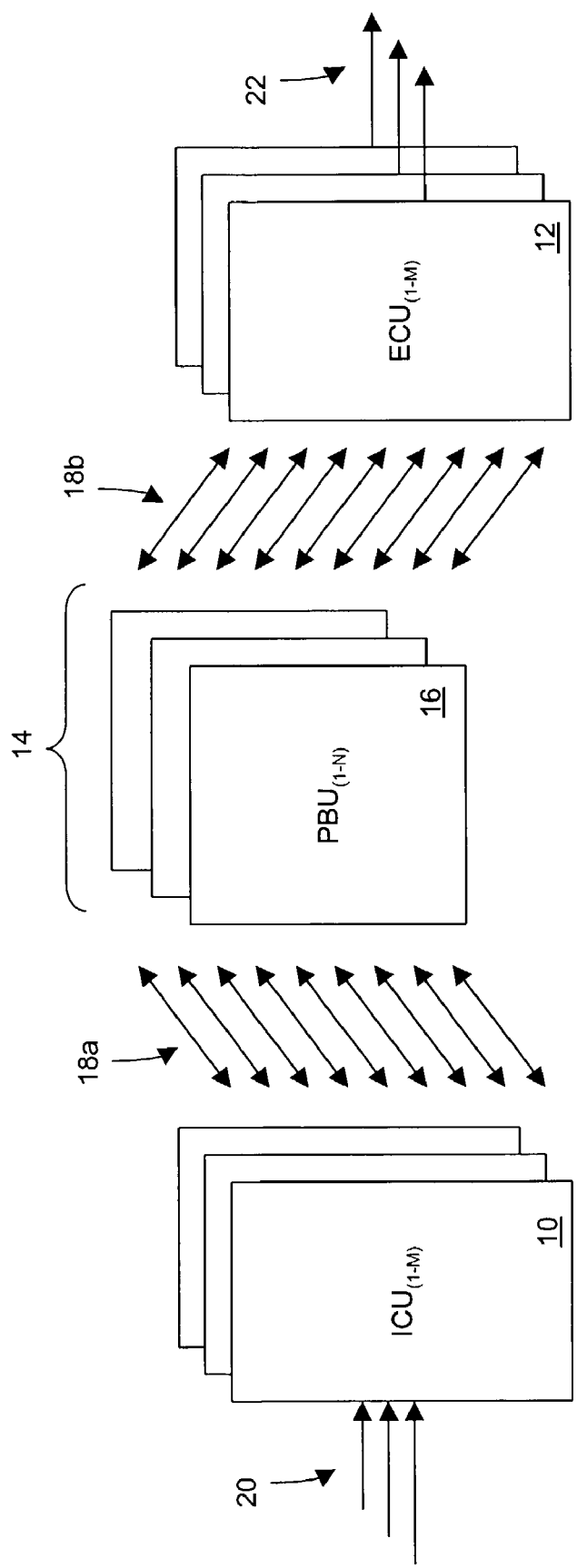
FIG. 1 is a schematic block diagram of a packet switching system having M ingress control units, N packet buffer units, and M egress control units according to one embodiment of the invention.

FIG. 1 is a schematic block diagram of a packet switching system according to one embodiment of the invention. The system includes M ingress control units (ICUs) 10 and M egress control units (ECUs) 12 coupled to a switch fabric 14 that includes N packet buffer units (PBUs) 16. Each ICU and ECU includes a link 18a, 18b to each PBU 16 so that each ICU and ECU may communicate with each PBU via their dedicated links. According to one embodiment N=M.

Each ICU 10 may have one or more associated input ports 20 and each ECU 12 may have one or more associated output ports 22. At any given time, all or a subset of the ICUs 10 receive data packets which are destined for all or a subset of the output ports 22. The packets may include, but are not limited to Ethernet frames, ATM cells, TCP/IP and/or UDP/IP packets, and may also include other Layer 2 (Data link/MAC Layer), Layer 3 (Network layer), or Layer 4 (Transport Layer) data units.

Upon receipt of a packet by an ICU, the ICU forwards the packet to a PBU via its dedicated link for storing. The PBU stores the packet in memory and transmits a notification to all ECUs that may be interested in receiving the packet via their respective egress links. If a receiving ECU has enough space in its appropriate queue, it queues a memory reference contained in the notification that may be used to retrieve the packet, and transmits an indication to the PBU, referred to as a booking message, that the address has been queued for causing the PBU to keep the packet in memory until it is requested.

When it is time to forward the packet to its destination, the ECUs that have booked the packet transmit a request to the PBU 16 to retrieve the packet. The PBU retrieves the packet and transmits it to the requesting ECUs for forwarding via one or more associated egress ports.

Figure 2:
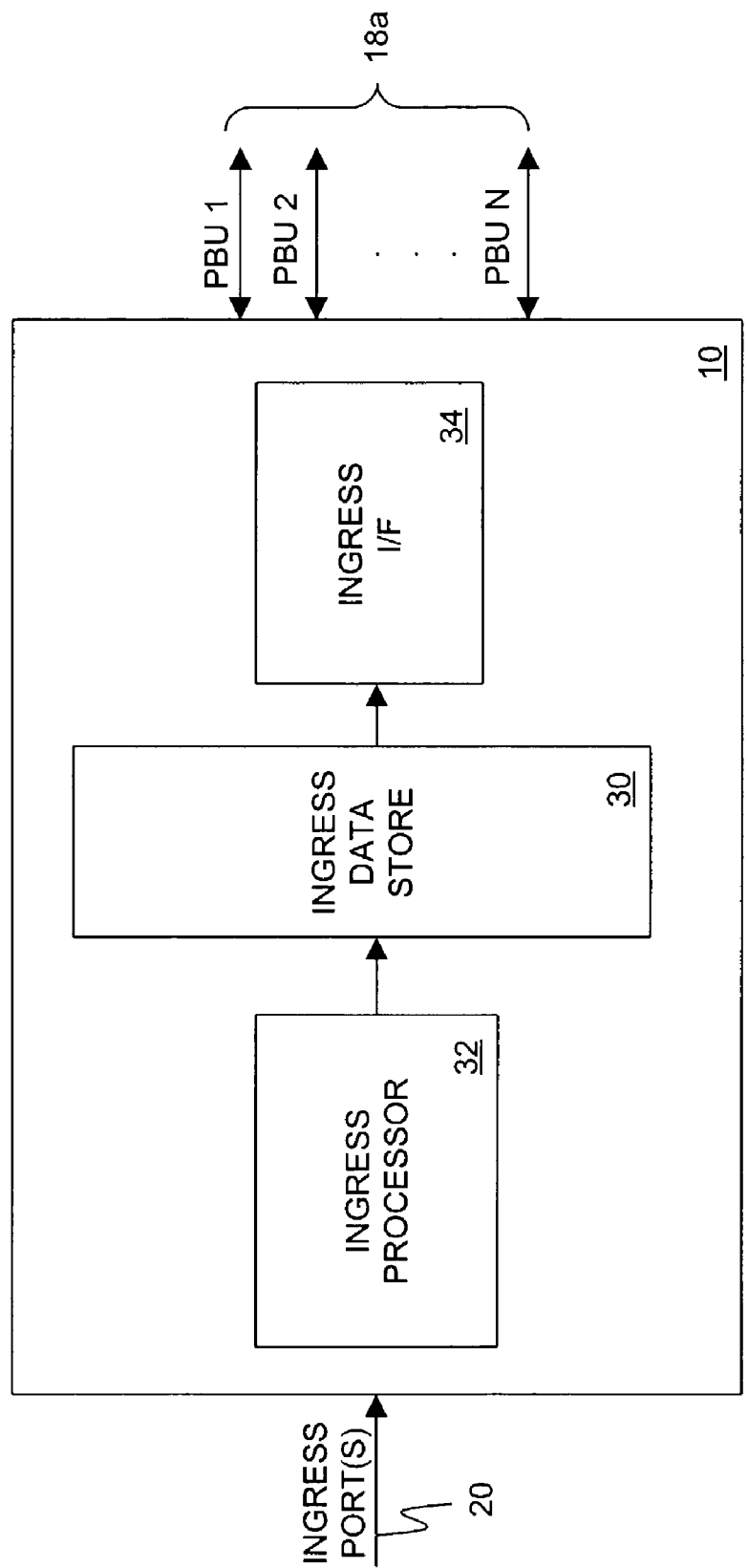
FIG. 2 is a schematic block diagram of an exemplary ingress control unit according to one embodiment of the invention.

FIG. 2 is a schematic block diagram of an exemplary ICU 10 according to one embodiment of the invention. The ICU in the illustrated embodiment includes an ingress processor 32 which is coupled to an ingress data store 30 which is in turn coupled to an ingress interface 34. The ingress packet processor 32 receives inbound packets and performs policing, accounting, forwarding, and any other packet processing task for the packets as is conventional in the art.

The ingress data store 30 may be a first-in-first-out (FIFO) buffer for receiving and temporarily storing the inbound data packets. The ingress data store 30 may be desirable if the data rate of one or more of the ingress ports 20 is lower or higher than the data rate of the ingress links 18a to the PBU 16. An embodiment may exist, however, where the ICU 10 does not include an ingress data store 30.

The ingress interface 34 forwards the inbound data packets to the PBU via the ingress links 18a. A particular PBU may be selected based on a pseudo random algorithm that is adjusted by weight information associated with each PBU, for allowing the workload to be balanced among the various PBUs.

Figure 3:
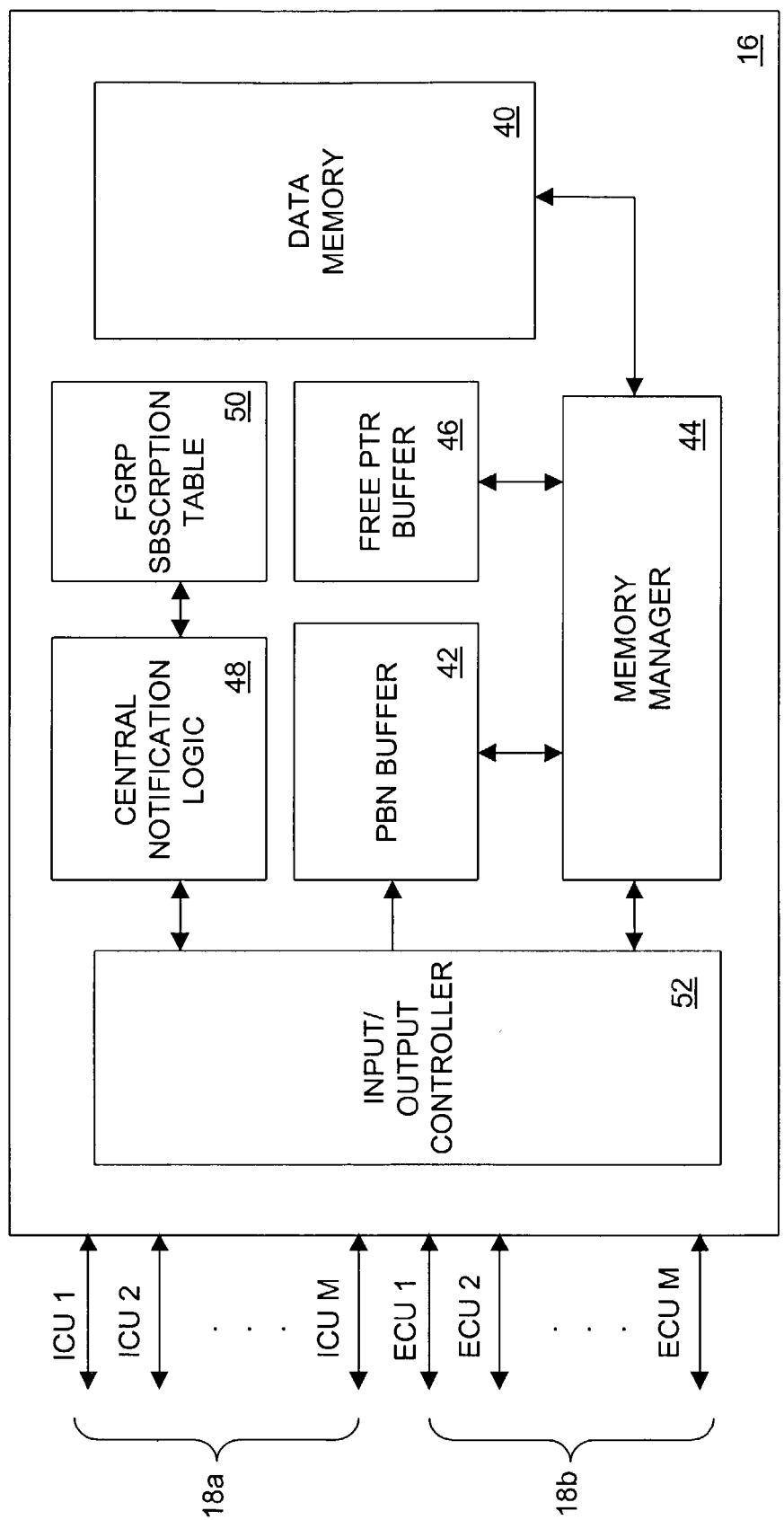
FIG. 3 is a schematic block diagram of an exemplary packet buffer unit according to one embodiment of the invention.

FIG. 3 is a schematic block diagram of an exemplary PBU 16 according to one embodiment of the invention. The PBU in the illustrated embodiment includes a data memory 40 for storing packets received from the ICUs 10. Different portions of the packet are stored in the data memory in different memory locations that are accessed via a linked list of pointers. The data memory 40 may be implemented as a dual-port memory where one of the ports is used for writing packets into the memory while the other port is used for reading stored packets from the memory. In an alternative embodiment, a dual port memory may be emulated via two single port memories, as is disclosed in further detail in "SWITCH FABRIC WITH DUAL PORT MEMORY EMULATION SCHEME," Ser. No. 10/180,279 filed on Jun. 26, 2002, and assigned to the Assignee of the present case, the contents of which are incorporated herein by reference.

The PBU 16 further includes a PBN buffer 42 which may be implemented as a dynamic random access memory (DRAM) or a static RAM (SRAM). Each entry in the PBN buffer 42 includes an address, referred to as a PBN address, of a memory location where at least a portion of the packet is stored.

The PBN buffer 42 is coupled to a memory manager 44 which controls the free memory space in the data memory 40, assigns the free memory space to new packets that need to be stored in the data memory, and assists in the retrieval of packets from the data memory. A free pointer buffer 46 may be used for maintaining track of free memory locations that may be allocated to new incoming packets.

The PBU 16 also includes a central notification logic 48 coupled to a flow group (FGRP) subscription table 50. The FGRP subscription table 50 indicates, for each particular flow group, an ECU that has subscribed to the flow group. According to one embodiment, the central notification logic 48 determines the flow group associated with an incoming packet and transmits notifications to ECUs that have subscribed to that flow group and would therefore be interested in receiving the packet. According to one embodiment of the invention, the notifications transmitted by the PBU are organized according to the ICUs triggering the notifications, and evenly spread in time so as to not overload a receiving ECU, as is described in further detail below.

The PBU 16 further includes an input/output controller 52 communicating with each ICU 10 and ECU 12 via their respective ingress and egress links 18a, 18b. The input/output controller 52 receives packets and/or messages from the ICUs 10 and ECUs 12, and separates the packets and/or messages for forwarding to the appropriate components within the PBU.

For example, the input controller 50 receives from the ICUs 10 inbound packets that are forwarded to the memory manager 44 for storing the packets in the data memory 40. The input controller 50 further receives packet request messages that are forwarded to the PBN buffer 42 for retrieving packets for the ECUs 12. In alternate embodiments, the input/output controller 52 may receive additional messages from the ECUs, such as, for example, booking messages associated with packets stored in memory, indicating that the packets are to be maintained in memory until requested by the ECUs.

The input/output controller 52 transmits notification messages received from the central notification logic 48 to the ECUs indicating that a packet in which an ECU may be interested in has been received and stored in the data memory 40. The input/output controller 52 also receives packets retrieved from the data memory 40 and forwards those packets to the ECUs 12 upon their request.

It is understood, of course, that FIG. 3 illustrates a block diagram of the PBU 16 without obfuscating inventive aspects of the present invention with additional elements and/or components that may be required or desirable for creating the PBU. For example, the PBU may include a booking buffer reflecting booking messages received from the ECUs.

Figure 4:
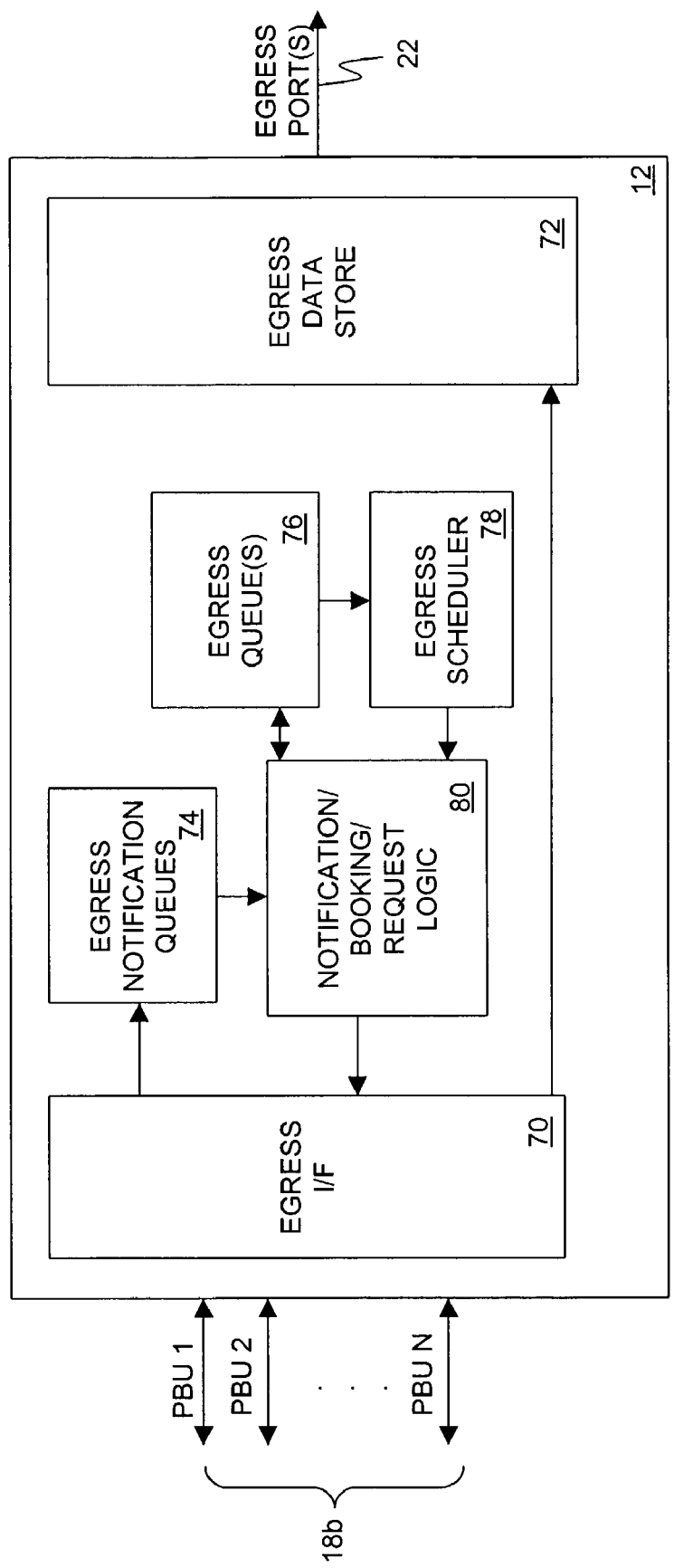
FIG. 4 is a schematic block diagram of an exemplary egress control unit according to one embodiment of the invention.

FIG. 4 is a schematic block diagram of an exemplary ECU 12 according to one embodiment of the invention. According to the illustrated embodiment, the ECU 12 includes an egress interface 70 communicating with the PBUs 16 over their respective egress links 18b. The egress interface 70 receives packets and/or messages from the PBUs, and processes and forwards those packets and/or messages to the appropriate egress components.

The egress interface 70 receives notification messages from the PBUs 16 indicating that the packets that the ECU may be interested in receiving have been stored in the transmitting PBU's data memory 40. The notification message packets are forwarded to one or more egress notifications queues 74 for temporarily storing and processing.

According to one embodiment, if N is a maximum number of notification messages that an ECU may receive at a single time in the event that all N PBUs transmit a notification message to the ECU, and X is a number of cycles needed for processing each notification message, a maximum of N/X notifications may be concurrently stored and processed by the ECU at each cycle using N/X egress notification queues 74 to prevent the loss or back-up of the notification messages. Thus, in the scenario where 32 PBUs may all transmit notifications to the ECU at a single time, and the processing time for each notification is 4 cycles, 8 notifications may be concurrently stored and processed by 8 egress notification queues 74.

Each of the N/X egress notification queues is implemented as a dual port random access memory (RAM). According to one embodiment, a maximum of N/X notifications received from the PUBs are selected at each cycle for allowing the N/X RAMs to be concurrently accessed for writing a single notification in each RAM in a non-blocking manner.

Upon storage of the notification messages in the egress notification queues 74, each notification message is forwarded to a notification/booking/request logic 80 that determines if the queue level of one or more egress queues 76 for which the notification was sent is identified as being too high. The notification is discarded for the queues whose queue levels are too high. For the other associated queues, the notification and booking logic 80 stores all or a portion of the notification in the queues. According to one embodiment, a reference to the associated packet that is transmitted in the notification is stored in the queues.

According to one embodiment, the notification/booking/request logic 80 may transmit a booking message to the transmitting PBU 16 indicating that the packet reference was enqueued, and that the associated packet is to be maintained in the PBU's data memory 40.

The ECU 12 further includes an egress scheduler 78 that dequeues the packet references from the egress queues 76 according to a particular scheduling algorithm, such as, for example, a weighted round robin algorithm, class based dequeuing, or the like. When a packet associated with an enqueued packet reference is scheduled to be forwarded as determined by the scheduling mechanism, the notification/booking/request logic transmits a packet request message to the PBU 16. According to one embodiment, the packet request message includes the enqueued packet reference number, allowing the PBU to identify the appropriate packet to be retrieved. Once the retrieved packet is received by the ECU 12 via its egress interface 70, the ECU temporarily stores the packet in an egress data store 72 and forwards them via one or more egress ports 22.

Figure 5:
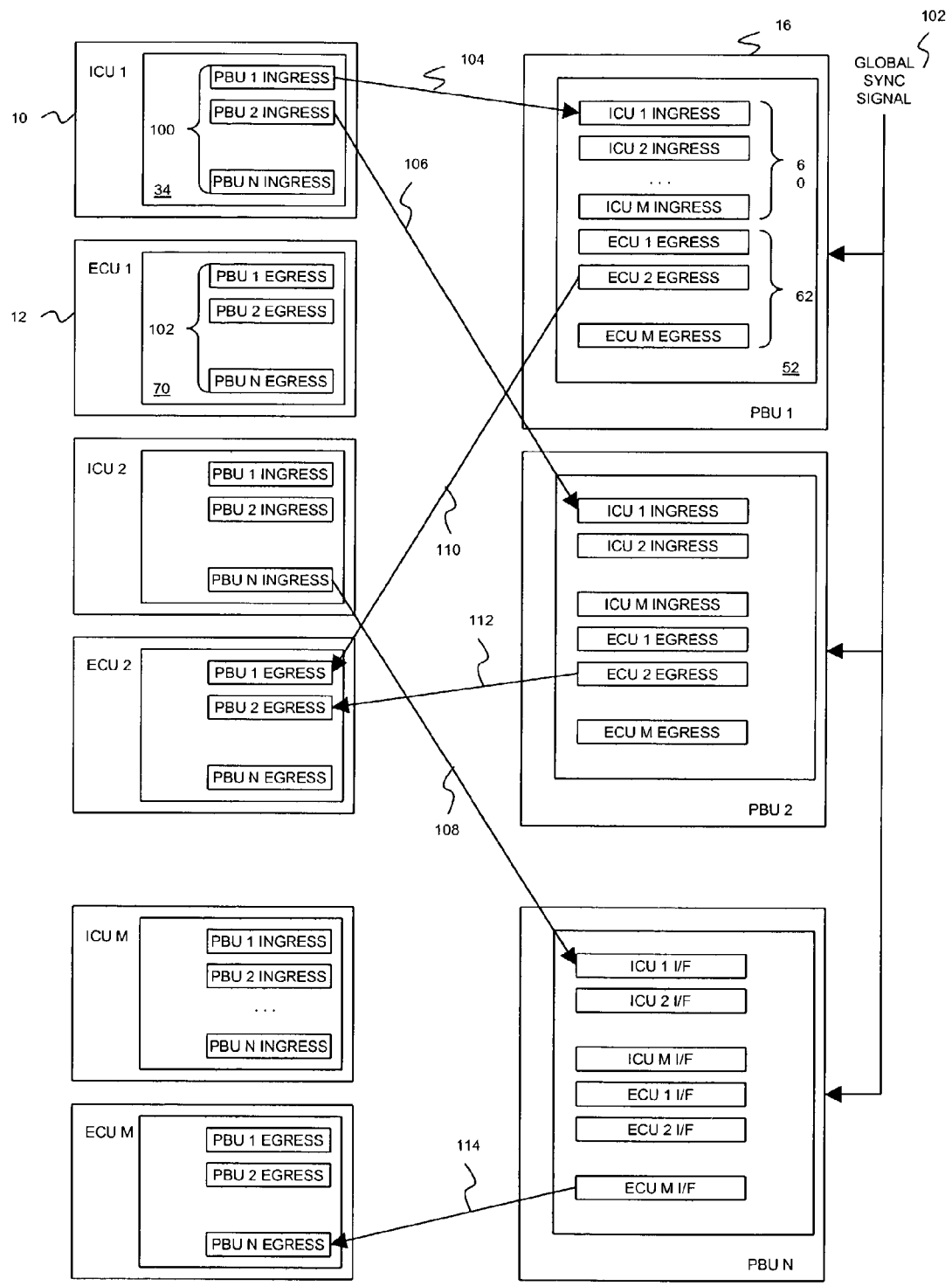
FIG. 5 is a modified view of the of the packet switching system of FIG. 1 depicting the interconnections of the ingress control units and egress control units to the packet buffer units according to one embodiment of the invention.

FIG. 5 is a modified view of the of the packet switching system of FIG. 1 depicting the interconnections of the ICUs 10 and ECUs 12 to the PBUs 16 according to one embodiment of the invention. The ingress interface 34 of each ICU 10 includes N PBU ingress interfaces 100 for communicating with each of the N PBUs 16. The egress interface 70 of each ECU 12 also includes N PBU egress interfaces 102 for communicating with the PBUs 16.

The input/output controller 52 of each of the PBUs 16 includes M ICU ingress interfaces 60 and M ECU egress interfaces 62 for respectively communicating with the M ICUs 10 and ECUs 12. Preferably, a one-to-one correspondence exists between an ICU ingress interface 60 and an ICU 10, as well as an ECU egress interface 62 and an ECU 12. In this manner, receipt of data via a particular ICU ingress interface 60 may identify a particular ICU 10 as the source of the data. Similarly, transmission of data via a particular ECU egress interface 62 may identify a particular ECU 12 as the recipient of the data.

In the embodiment illustrated in FIG. 5, packets, such as data packets from ICU "1" to PBU "1" are transmitted by ICU "1" via its PBU "1" ingress interface and received by PBU "1" via its ICU "1" ingress interface, as depicted by link 104. Data packets from ICU "1" to PBU "2" are transmitted by ICU "1" via its PBU "2" ingress interface and received by PBU "2" via its ICU "1" ingress interface, as depicted by link 106. Data packets from ICU "2" to PBU "N" are transmitted by ICU "2" via its PBU "N" ingress interface and received by PBU "N" via its ICU "2" ingress interface, as depicted by link 108.

In a similar manner, packets, such as notification packets, from PBU "1" to ECU "2" are transmitted by the PBU "1" via its ECU "2" egress interface and received by ECU "2"

via its PBU "1" egress interface, as depicted by link, 110. Packets from PBU "2" to ECU "2" are transmitted by PBU "2" via its ECU "2" egress interface and received by ECU "2" via its PBU "2" egress interface, as depicted by link 112. Packets from PBU "N" to ECU "M" are transmitted by PBU "N" via its ECU "M" egress interface and received by ECU "M" via its PBU "N" egress interface, as depicted by link 114.

According to one embodiment of the invention, the transmission of notification packets to the ECUs are synchronized according to a global synchronization signal 102. Once synchronized, the notifications are spread out in time for achieving a constant, non-bursty load on the receiving ECUs. Thus, in the illustrated example, notification packets generated by PBU "1" and PBU "2" in response to packets received from ICU "1," are transmitted to ECU "2" at different times.

Figure 6:
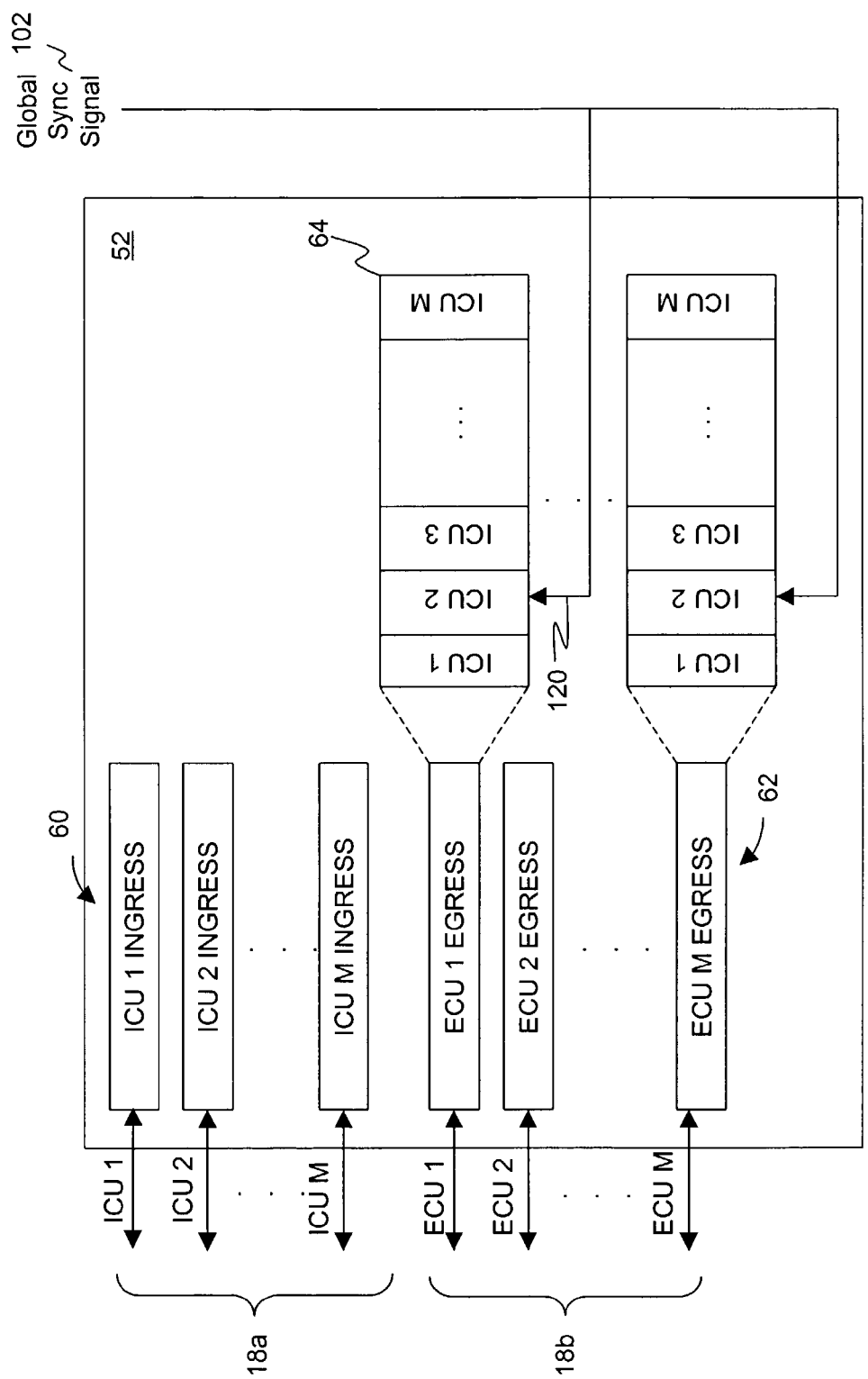
FIG. 6 is a more detailed schematic block diagram of an input/output controller of a particular packet buffer unit according to one embodiment of the invention.

FIG. 6 is a more detailed schematic block diagram of the input/output controller 52 of a particular PBU 16 according to one embodiment of the invention. In the embodiment illustrated in FIG. 6, each of the M ECU egress interfaces 62 is associated with a notification queue 64 storing notifications that are to be transmitted via the ECU egress interface to a corresponding ECU 12. The notification queue 64 includes M entries for each ICU 10 that may transmit a data packet and trigger a notification.

A notification generated in response to a packet received from a particular ICU 10 is stored in the notification queue 64 of each ECU egress interface 62 that is to transmit the notification to the interested ECU 12. The entry of the notification queue 64 where the notification is stored is the entry associated with the ICU 10 transmitting the packet. In this way, notifications may be sorted according to their source ICUs.

For example, assume that a packet transmitted by ICU "2" is destined for ECUs "1" and "2." The packet is received at a particular PBU by its ICU link "2" ingress interface, and a notification is generated for transmitting to ECUs "1" and "2." Prior to transmitting the notification, it is stored in the notification queues for ECU "1" egress interface and ECU "2" egress interface at entries associated with ICU "2."

According to one embodiment, the input/output controller 52 includes a time-driven read pointer 120 that causes notifications to be retrieved from the notification queues 64 for transmittal to their respective ECUs in an evenly spread-out manner. During initialization and at periodic re-synchronization periods, the read pointers of the notifications queues of the N PBUs 16 are synchronized via a global synchronization signal 102 to an initial starting location of the notification queues. According to one embodiment, the synchronization signal is transmitted over a single wire that is distributed to the N PBUs. The periodic re-synchronization allows the various clock counters associated with the read pointers to be synchronized as accurately as possible.

In one embodiment of the invention, the start location of the read pointers during initialization correspond to a number assigned to the corresponding PBU. The PBUs are aware of their numbers by, for example, a slot position in which they reside. During (re)synchronization, a phase shift is added to the read pointer based on the number assigned to the PBU, allowing a correct starting read-out location. Thus, for the notification queues associated with PBU number "1," the read pointers of the queues are initialized to entry number "1" of the notification queues that correspond to ICU number "1," and notification queues associated with PBU number "2," the read pointers of the queues are initialized to entry number "2" of the notification queues that correspond to ICU number "2." In this manner, PBU number "1" starts its transmission with notification messages that have been triggered by ICU number "1" while PBU "2" starts its transmission with notification messages that have been triggered by ICU number "2."

After the transmission of a current notification message is complete, the read pointers of the notification queues advance to a next entry of the notification queue for retrieving and transmitting a next notification message in a synchronized manner. According to one embodiment, the read pointers advance every X cycles where X is the number of cycles used by an ECU for processing a single notification.

Figure 7:
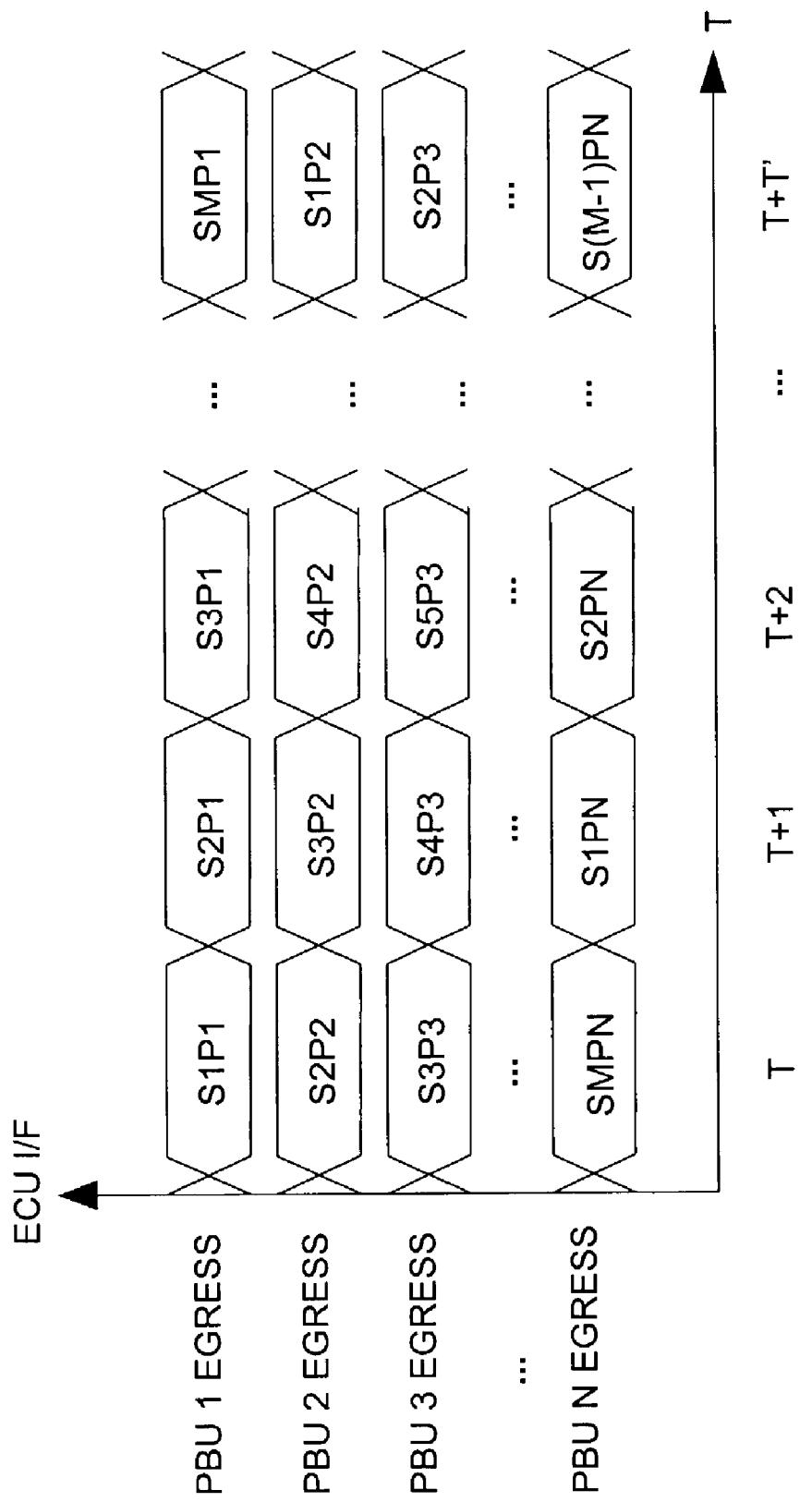
FIG. 7 is a timing diagram of notifications received by a particular egress control unit according to one embodiment of the invention.

FIG. 7 is a timing diagram of the notifications received by a particular ECU according to one embodiment of the invention. A notification message with ICU source x coming from PBU y is depicted as SxPy. In the embodiment illustrated in FIG. 7, at time T, the ECU receives via its PBU "1" egress interface a notification message with ICU source "1" coming from PBU "1." Also at time T, the ECU receives via its PBU "2" egress interface a notification message with ICU source "2" coming from PBU "2." Thus, no two notification messages associated with a same ICU source is received by the ECU at any given time, assuming that there are enough number of different sources as there are PBUs that may transmit the concurrent notifications.

Figure 8:
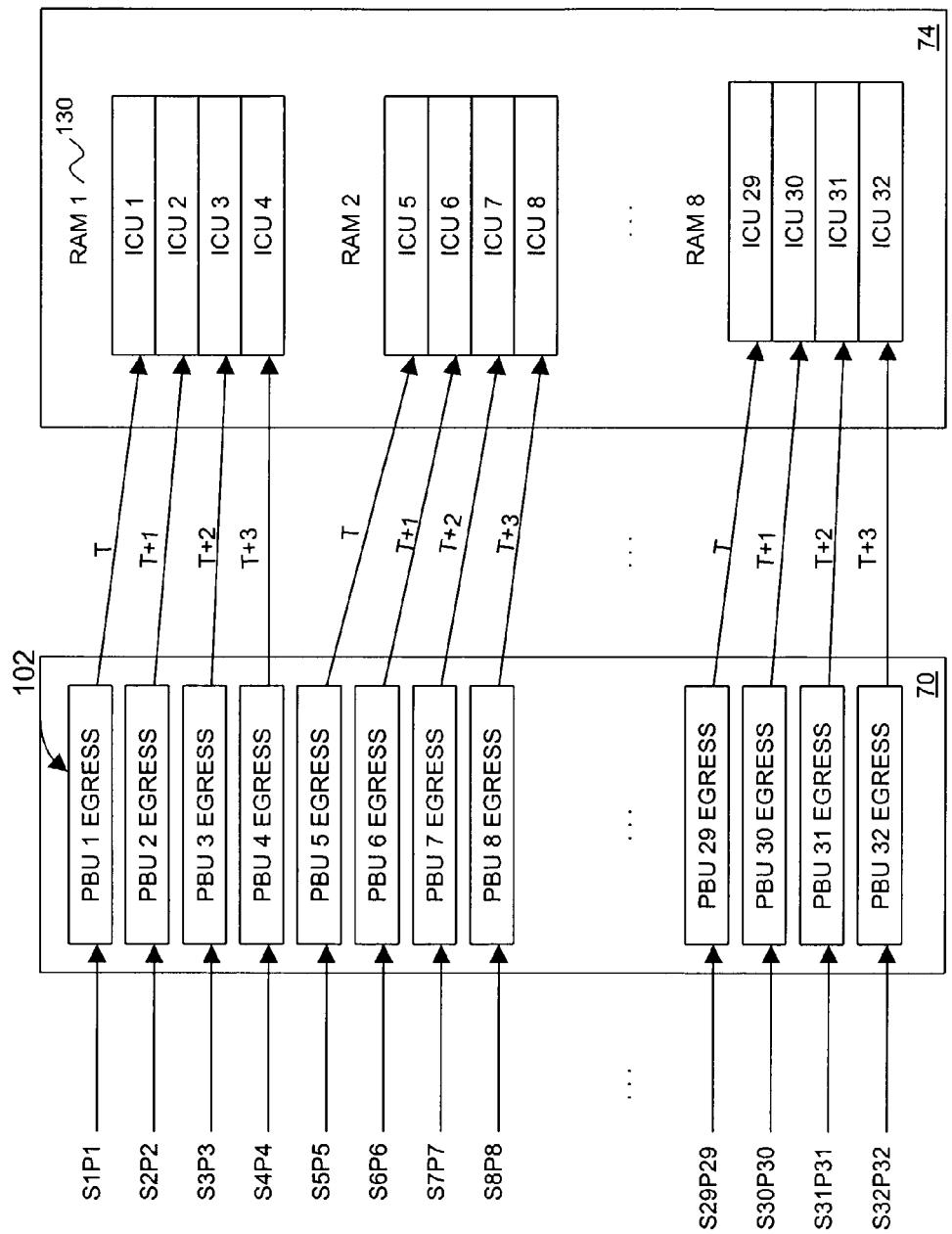
FIG. 8 is a more detailed block diagram of the receipt and processing of notifications by a particular egress control unit according to one embodiment of the invention.

FIG. 8 is a more detailed block diagram of the receipt and processing of notifications by a particular ECU according to one embodiment of the invention. In the illustrated embodiment, it is assumed that a total number of ECUs, ICUs, and PBUs is 32. At any point in time, the ECU may receive notifications from all 32 PBUs, ordered by source ICU as is illustrated in the timing diagram of FIG. 7. The notifications are received by the ECU's PBU egress interfaces 102 associated with the transmitting PBUs 16.

It is further assumed that for purposes of this example, the number of cycles for processing each of the 32 notifications is 4. Thus, 8 notifications are processed simultaneously for storing in 8 egress notification queues 74 in order to prevent the loss or back-up of future notifications.

According to one embodiment, each egress notification queue is implemented as a dual port RAM 130 where each entry stores a notification associated with a specific source ICU. In processing the received notifications, 8 of the received notifications are selected at a time so as to allow simultaneous writing of the notifications in each RAM without write collisions. This may be accomplished by examining the ICU source associated with the received notifications and selecting 8 notifications whose source ICUs are associated with entries of each of the 8 RAMs.

In the embodiment illustrated in FIG. 8, at time T, the notification messages concurrently selected and stored in the RAMs are associated with ICU source "1," ICU source "5," ICU source "9," ICU source "13," ICU source "17," ICU source "21," ICU source "25," and ICU source "29." At time T+1, the notification messages concurrently selected and stored at the RAMs are associated with ICU source "2," ICU source "6," ICU source "10," ICU source "14," ICU source "18," ICU source "22," ICU source "26," and ICU source "30." After time T+4, all the received notifications would have been stored and processed, allowing the ECU to receive another maximum of 32 notifications from the 32 PBUs.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. A packet switching system comprising:
   a plurality of ingress units;
   a plurality of egress units;
   a switch fabric coupled to the plurality of ingress units and egress units, characterized in that the switch fabric receives packets from the plurality of ingress units and generates notification messages in response, each notification message being ordered based on the ingress unit transmitting the associated packet, further characterized in that the notification message is transmitted to one or more egress units according to the order assigned to the message based on the associated ingress unit;
   the switch fabric including a plurality of buffer untis receiving and storing packets transmitted by the plurality of ingress units, each buffer unit including a notification queue for each of the plurality of egress units; and
   a set of first pointers for retrieving notifications stored in notification queues of a first buffer unit are initialized to a first start entry and a set of second pointers for retrieving notifications stored in notifications queues of a second buffer unit are initialized to a second start entry.

2. The packet switching system of claim 1 wherein the switch fabric includes a notification queue including a plurality of entries for storing the notification messages, each entry being associated with one of the plurality of ingress units.

3. The packet switching system of claim 2, wherein the switch fabric includes a notification queue associated with each of the plurality of egress units for storing notification messages generated for its egress unit.

4. The packet switching system of claim 3, wherein the notifications stored in each notification queue is retrieved by a pointer that is initialized to a same start entry for each of the plurality of the notification queues.

5. The packet switching system of claim 1, wherein the pointers advance to a next entry of its respective notification queue in a synchronized manner.

6. The packet switching system of claim 1, wherein each of the plurality of egress units includes a first memory and a second memory for storing notification messages transmitted by the switch fabric, the first memory for storing notification messages generated based on packets transmitted by the first set of ingress units and the second memory being for storing notification messages generated based on packets transmitted by the second set of ingress units.

7. The packet switching system of claim 6, wherein the first memory and second memory are accessed concurrently for respectively storing a notification message.

8. A method for processing packets in a packet switching system including a plurality of ingress units, a plurality of egress units, and a switch fabric coupled to the plurality of ingress units and egress units, the method comprising:
   receiving at the switch fabric packets transmitted by the plurality of ingress units;
   generating at the switch fabric a notification message for each received packet;
   storing at the switch fabric the generated notification messages in one or more notification queues, the notification messages stored in the one or more notification queues being ordered according to the ingress unit transmitting the associated packet;
   retrieving a notification stored in each notification queue using a pointer that is initialized to a same start entry for each of the plurality of the notification queues; and
   transmitting the notification messages to one or more egress units according to the order of the notification messages in the one or more notification queues.

9. The method of claim 8, wherein each of the plurality of egress units is associated with a notification queue for storing notification messages generated for its egress unit.

10. The method of claim 8, wherein the switch fabric includes a plurality of buffer units receiving and storing packets transmitted by the plurality of ingress units, each buffer unit including a notification queue for each of the plurality of egress units.

11. The method of claim 10 further comprising:
   initializing to a first start entry a set of first pointers for retrieving notifications stored in notification queues of a first buffer unit; and
   initializing to a second start entry a set of second pointers for retrieving notifications stored in notifications queues of a second buffer unit.

12. The method of claim 11 further comprising advancing each pointer to a next entry of its respective notification queue in a synchronized manner.

13. The method of claim 8, wherein each of the plurality of egress units includes a first memory and a second memory for storing notification messages transmitted by the switch fabric, the method further comprising:
   storing in the first memory notification messages generated based on packets transmitted by the first set of ingress units; and
   storing in the second memory notification messages generated based on packets transmitted by the second set of ingress units.

14. The method of claim 13, wherein the storing in the first memory and the storing in the second memory are performed in a concurrent manner.

15. A packet switching system comprising:
   a plurality of ingress units;
   a plurality of egress units;
   a switch fabric coupled to the plurality of ingress units and egress units, characterized in that the switch fabric receives packets from the plurality of ingress units and generates notification messages in response, each notification message being ordered based on the ingress unit transmitting the associated packet, further characterized in that the notification message is transmitted to one or more egress units according to the order assigned to the message based on the associated ingress unit; and
   each of the plurality of egress units includes a first memory and a second memory for storing notification messages transmitted by the switch fabric, the first memory for storing notification messages generated based on packets transmitted by the first set of ingress units and the second memory being for storing notification messages generated based on packets transmitted by the second set of ingress units.

16. The packet switching system of claim 15, wherein the switch fabric includes a notification queue including a plurality of entries for storing the notification messages, each entry being associated with one of the plurality of ingress units.

17. The packet switching system of claim 16, wherein the switch fabric includes a notification queue associated with each of the plurality of egress units for storing notification messages generated for its egress unit.

18. The packet switching system of claim 17, wherein the notifications stored in each notification queue is retrieved by a pointer that is initialized to a same start entry for each of the plurality of the notification queues.

19. The packet switching system of claim 18, wherein the pointers advance to a next entry of its respective notification queue in a synchronized manner.

20. The packet switching system of claim 19, wherein the first memory and second memory are accessed concurrently for respectively storing a notification message.

* * * * *